US007185437B2

(12) United States Patent
Behbahany

(10) Patent No.: US 7,185,437 B2
(45) Date of Patent: Mar. 6, 2007

(54) CHAINSAW BAR TENSIONING APPARATUS

(75) Inventor: Shane Behbahany, Milwaukie, OR (US)

(73) Assignee: Carlton Company, Milwaukie, OR (US)

( * ) Notice: Subject to any disclaimer, the term of this patent is extended or adjusted under 35 U.S.C. 154(b) by 76 days.

(21) Appl. No.: 10/713,293

(22) Filed: Nov. 14, 2003

(65) Prior Publication Data

US 2004/0148788 A1 Aug. 5, 2004

Related U.S. Application Data

(60) Provisional application No. 60/246,710, filed on Nov. 15, 2002.

(51) Int. Cl.
*B27B 17/14* (2006.01)
*B23D 57/02* (2006.01)

(52) U.S. Cl. ............................ 30/386; 30/381; 30/383; 30/385; 83/816

(58) Field of Classification Search .................. 83/818, 83/814, 816; 30/886, 383, 385, 381, 382, 30/384, 151, 387, 123.4, 286; 144/73; 51/148; 474/101, 109, 111, 136
See application file for complete search history.

(56) References Cited

U.S. PATENT DOCUMENTS

| | | | | | |
|---|---|---|---|---|---|
| 2,074,567 | A | * | 3/1937 | Shyvers | 273/118 A |
| 2,348,588 | A | * | 5/1944 | Arsneau | 144/34.1 |
| 2,532,981 | A | * | 12/1950 | Wolfe | 30/385 |
| 2,765,821 | A | * | 10/1956 | Strunk | 30/386 |
| 3,039,337 | A | * | 6/1962 | Stuart-Prince | 72/409.11 |
| 3,075,611 | A | * | 1/1963 | Baringer | 182/134 |
| 3,194,284 | A | * | 7/1965 | Walker | 30/386 |
| 3,232,325 | A | * | 2/1966 | Hamilton | 30/386 |
| 3,279,508 | A | * | 10/1966 | Ehlen et al. | 30/385 |
| 3,354,755 | A | * | 11/1967 | Legrande | 81/314 |
| 3,382,898 | A | * | 5/1968 | Walker | 30/382 |
| 3,435,859 | A | * | 4/1969 | Walker | 83/818 |
| 4,382,334 | A | * | 5/1983 | Reynolds | 30/386 |
| 4,977,708 | A | * | 12/1990 | Kloft | 451/359 |
| 5,119,798 | A | | 6/1992 | Scott | 125/21 |
| 5,144,751 | A | | 9/1992 | Weber | 30/386 |
| 5,174,029 | A | * | 12/1992 | Talberg | 30/386 |
| 5,345,686 | A | * | 9/1994 | Zimmermann | 30/386 |

(Continued)

FOREIGN PATENT DOCUMENTS

| | | |
|---|---|---|
| EP | 1129831 A2 | 9/2001 |

(Continued)

*Primary Examiner*—Boyer D. Ashley
*Assistant Examiner*—Ghassem Alie
(74) *Attorney, Agent, or Firm*—Stoel Rives LLP

(57) ABSTRACT

A chain saw bar tensioning apparatus is disclosed comprising a sliding member having a recess formed therein. The sliding member is adjacent to a first tensioning member that biases the sliding member in a direction such that when the apparatus is incorporated into a chain saw bar and mounted to a chain saw having a mounting stud, the sliding member is biased towards the mounting stud. The apparatus further comprises a latch adjacent to a second tensioning member. The recess of the sliding member is configured to receive the latch and the second tensioning member biases the latch towards the sliding member such that, when the sliding member is forced in a direction away from the mounting stud, the latch will eventually enter the recess and prevent the sliding member from moving towards the mounting stud.

6 Claims, 3 Drawing Sheets

U.S. PATENT DOCUMENTS

| | | | | |
|---|---|---|---|---|
| 5,435,065 | A * | 7/1995 | Raczykowski | 30/382 |
| 5,491,899 | A | 2/1996 | Schliemann et al. | 30/386 |
| 5,497,557 | A | 3/1996 | Martinsson | 30/386 |
| 5,528,835 | A | 6/1996 | Ra | 30/386 |
| 5,896,670 | A | 4/1999 | Gibson et al. | 30/386 |
| 5,983,508 | A | 11/1999 | Sundstrom | 30/386 |
| 5,987,786 | A | 11/1999 | Gibson et al. | 37/302 |
| 6,049,986 | A * | 4/2000 | Calkins et al. | 30/386 |
| 6,061,915 | A * | 5/2000 | Seigneur et al. | 30/386 |
| 6,148,525 | A | 11/2000 | Mizutani et al. | 30/386 |
| 6,311,599 | B1 * | 11/2001 | Lindehall | 83/819 |
| 6,442,843 | B1 * | 9/2002 | Jue et al. | 30/151 |
| 6,694,623 | B1 * | 2/2004 | Haughey | 30/386 |

FOREIGN PATENT DOCUMENTS

| | | |
|---|---|---|
| EP | 1174230 A1 | 1/2002 |

* cited by examiner

CHAINSAW BAR TENSIONING APPARATUS

RELATED APPLICATIONS

This application claims the benefit under 35 U.S.C. § 119(e) of U.S. Provisional Patent Application No. 60/426,710, filed Nov. 15, 2002, titled "Chain Saw Bar Tensioning Assembly," which is incorporated herein by reference.

BACKGROUND

FIG. 4 illustrates a prior-art chain saw 10 having a guide bar 12 equipped with a chain tensioner. The bar 12 is mounted to the housing 14 of the chain saw on studs 16 and 18. The bar 12 has a mounting slot 20 that receives the studs 16 and 18 and permits the guide bar 12 to be moved toward and away from a drive sprocket 22 as indicated by arrow 24. The guide bar 12 is moved toward the drive sprocket 22 to permit mounting a saw chain 26 in the edge groove 13 of the guide bar 12 and onto the drive sprocket 22. After the chain 26 has been mounted on the drive sprocket 22 and the guide bar 12, the guide bar 12 is moved away from the drive sprocket 22 to tension the chain 26 to its proper operating condition. When the guide bar 12 has been moved outwardly from the drive sprocket 22 to the desired position, lock nuts 28 and 30 are tightened on the studs 16 and 18 to lock the guide bar 12 in position. (The reader will appreciate that whereas two studs are desirable to control the movement of the bar, locking may be achieved with only one locking nut.)

The guide bar 12 has a mounting slot 20 that extends through the guide bar 12, that is, through the outer laminates 36, 38 and the center laminate 34 thereof to permit mounting the guide bar 12 onto the studs 16, 18 of the chain saw 10. The slot 20 provided in the outer laminates 36, 38 has a width that corresponds closely to the diameter of the studs 16, 18. A formed slot of the center laminate 34 has a channel-like portion 40 and a circular portion.

The guide bar 12 is initially mounted on the studs, 16, 18 of the chain saw 10 with the studs 16, 18 being received in the slot 20 of the guide bar 12. Nuts 28, 30 are loosely installed on the studs 16, 18 (or alternatively on only one of the studs) permitting the guide bar 12 to be slidably movable along the studs 16, 18 as indicated by arrow 24. The guide bar 12 is initially moved toward the drive sprocket 22 to permit mounting the saw chain 26 onto the drive sprocket 22 and the guide bar 12 in the conventional manner. This will require that the rack 48 be moved away from the end 21 of the slot 20 by rotating the pinion 60. When the saw chain 26 is properly entrained around the drive sprocket and the guide bar 12, the guide bar 12 is moved outwardly away from the drive sprocket 22 by utilizing the chain tensioner. A tool suitable for rotating the pinion 60 such as the tip of a flat bladed screwdriver is inserted through the aperture 46 and into the slot 64 of the pinion 60. The pinion 60 is rotated such that the rack 48 will be forced against the stud 16. Further rotation of the pinion 60 will force the guide bar 12 to move away from the drive sprocket 22. When the guide bar has been moved a sufficient distance away from the drive sprocket 22 to provide the proper operating tension of the saw chain 26, nuts 28 and 30 are tightened onto the studs 16, 18 to clamp the guide bar 12 to the housing 14.

The embodiments described and illustrated utilize the stud 16 (also referred to herein as the "mounting stud") which projects from the housing 14 and is typically threaded and is intended for aligning and affixing the guide bar relative to the housing. The present invention utilizes this threaded stud as a convenient bearing member. It will be appreciated, however, that other projections provided on the housing 14 such as a formed box for bar alignment only or even a projection specifically provided as a bearing member is encompassed by this invention.

BRIEF DESCRIPTION OF THE DRAWINGS

Understanding that the drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Figure 1:
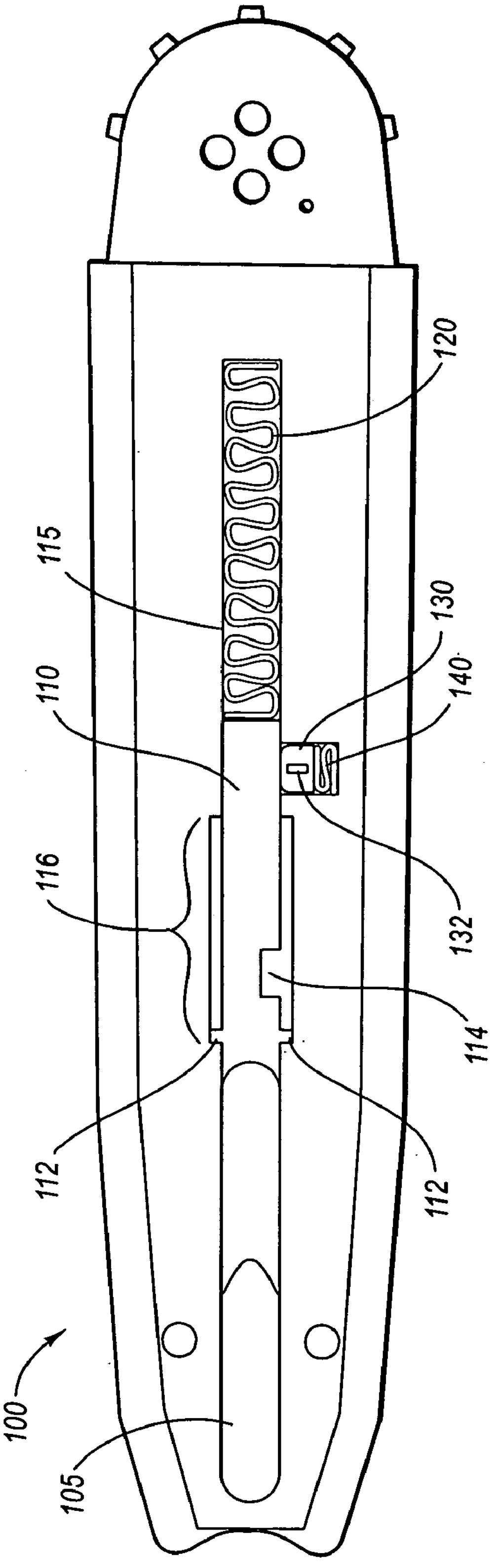
FIG. 1 is a side elevation view of a chain saw bar constructed according to one embodiment of the invention.
Figure 2:
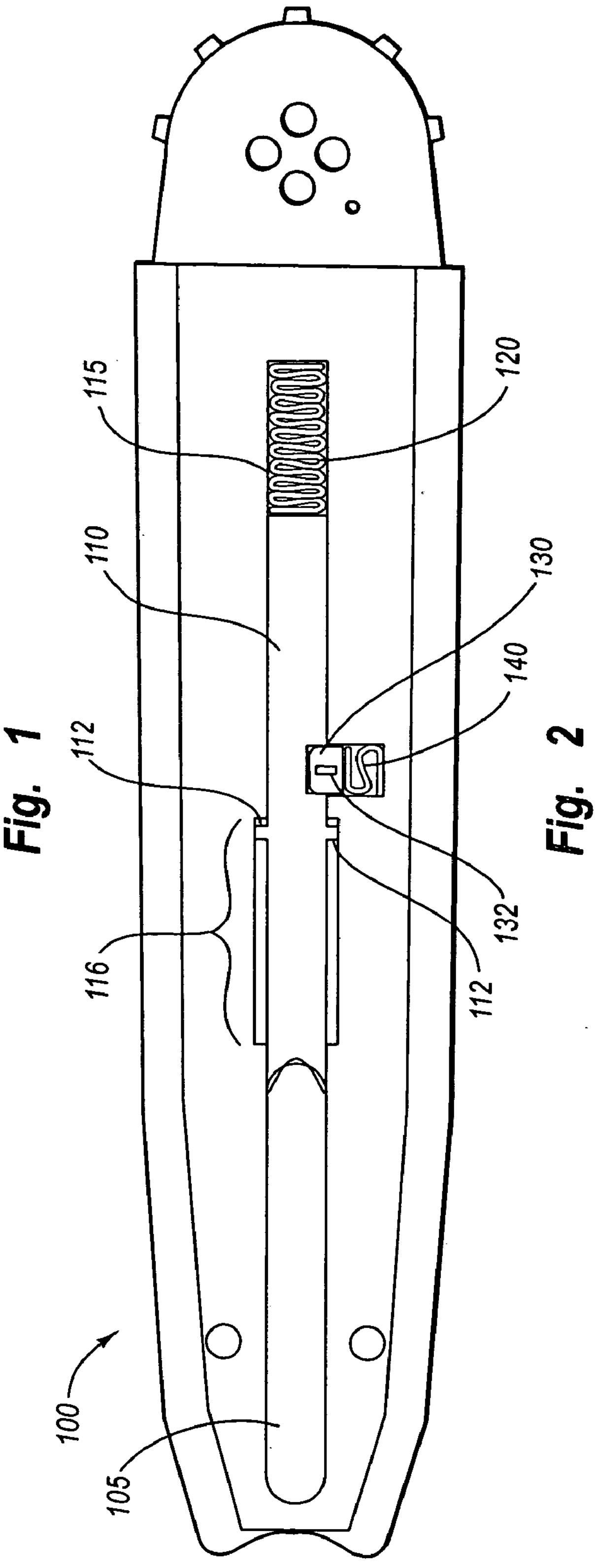
FIG. 2 is a side elevation view of the embodiment depicted in FIG. 1 wherein the sliding member is locked into position.

A first embodiment of the tensioning assembly invention is depicted in FIGS. 1–2. As shown in FIG. 1, a chain saw bar 100 is shown comprising a sliding member 110, a first tensioning member 120, a latch 130, and a second tensioning member 140. Sliding member 110 fits and is slidable within channel 115. Channel 115 has a wide portion 116, which is typically located somewhere between the ends of channel 115. The tensioning assembly of the present invention is typically incorporated between the outer guide plates of a three-layered chain saw bar. With respect to such chain saw bars, at least a portion of channel 115 will typically coincide with opening 105 in each of the outer guide plates. A more detailed discussion of laminated chain saw bars can be found in U.S. patent application Ser. No. 6,049,986 titled "Chain Saw Guide Bar Equipped with Chain Tensioner," which is hereby incorporated by reference in its entirety.

Sliding member 110 has approximately the same width as channel 115 along the length of channel 115 except along the length of wide portion 116 of channel 115. This configuration allows sliding member 110 to be slid along channel 115 in either direction. Adjacent to sliding member 110 in channel 115 is a first tensioning member 120. It is contemplated that a sliding member is "adjacent" to a tensioning member if they are separate but next to one another or if they are integral, attached, or otherwise connected to one another. First tensioning member is depicted in the accompanying figures as a spring. However, different types of springs or any suitable structure capable of biasing the sliding member in one direction could be used. For example, an elastomer or some other material that has properties of tension could be incorporated in or connected to the material. Any such structure can be considered a means for biasing the sliding member, otherwise referred to as a first biasing means. A tensioning member, such as tensioning member 120 in FIGS. 1–2 or tensioning member 120' in FIG. 3, any other type of spring capable of performing the same function, and structures that have elastomers or other tension-imparting capabilities are all examples of means for biasing the sliding member or first biasing means.

From the view of the accompanying figures, first tensioning member 120 biases sliding member towards the left. FIG. 1 shows the sliding member pushed towards the left. With respect to the sliding member, this direction will typically correspond with the position of the mounting studs used to mount the chain saw bar on a chain saw. The mounting studs are typically mounted at and extend through opening 105. Because in the configuration shown in FIG. 1 first tensioning member 120 biases sliding member towards the mounting stud, in this configuration there will be a load on the mounting stud which serves to tension the chain and keep it tight. The embodiment depicted in FIGS. 1 and 2 has projections 112 that extend beyond the width of channel 115 such that they remain in the region of wider portion 116 and keep sliding member 110 within a given range of motion with respect to the rest of the chain saw bar. In should be understood, however, that projections 112 are optional and it is contemplated that some embodiments of the invention will have only a single projection, while others will not have any projections at all.

One or more recesses are formed in the sliding member 110. In the embodiment shown in FIG. 1, recess 114 is formed in a rectangular shape corresponding with the shape of latch 130. Latch 130 is adjacent to second tensioning member 140. Again, this means latch 130 can be separate from but next to second tensioning member 140 or it can be attached, connected, or integral with second tensioning member 140. Like first tensioning member 120, second tensioning member 140 is depicted in the accompanying figures as a spring. However, again, different types of springs or any suitable structure capable of biasing the latch could be used. An elastomer or some other material that has properties of tension could be incorporated in or connected to the material. Any such structure can be considered a means for biasing the latch, otherwise referred to as a second biasing means. A tensioning member, such as tensioning member 140 in FIGS. 1–2 or tensioning member 140' in FIG. 3, any other type of spring capable of performing the same function, and structures that have elastomers or other tension-imparting capabilities are all examples of means for biasing the latch or second biasing means.

Second tensioning member 140 biases latch 130 generally in the direction of sliding member 110. When it is desired that the chain be replaced, removed, readjusted, or otherwise loosened, sliding member 110 is forced against the direction in which first tensioning member 120 biases sliding member 110. Once sliding member 110 has been forced to the point at which recess 114 is adjacent to latch 130, second tensioning member 140 will naturally force latch 130 into recess 114, thereby locking sliding member 110 into place, as shown in FIG. 2.

In this position, there will be no load on the mounting stud via sliding member 110. In other words, the device will typically be in this configuration when it is desired that the chain be replaced, removed, readjusted, or otherwise loosened. When it is desired that the chain be tensioned once again, latch 130 is forced out of recess 114 and away from sliding member 110. An opening may be formed in one of the outer guide plates to allow access to latch 130 in order to apply the necessary force to accomplish this. In addition, the latch may optionally have a slot, indentation, or other means to allow an instrument to be inserted into or against the latch to apply this force. In the embodiment depicted in FIGS. 1–2, a slot 132 is formed in latch 130 for this purpose. Once the latch has been forced away from the sliding member (against the direction in which it is biased by the second tensioning member), the first tensioning member will naturally force the sliding member back towards the mounting stud (to the left in the accompanying figures).

Figure 3:
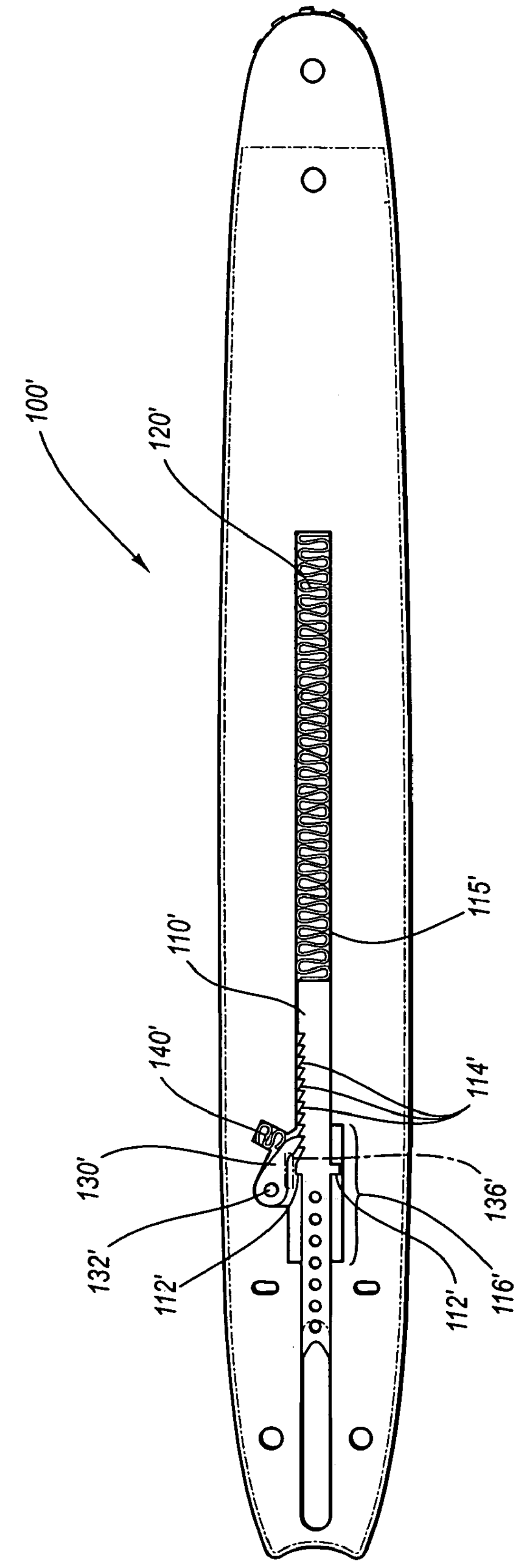
FIG. 3 is a side elevation view of a chain saw bar constructed according to a second embodiment of the invention.
Figure 4:
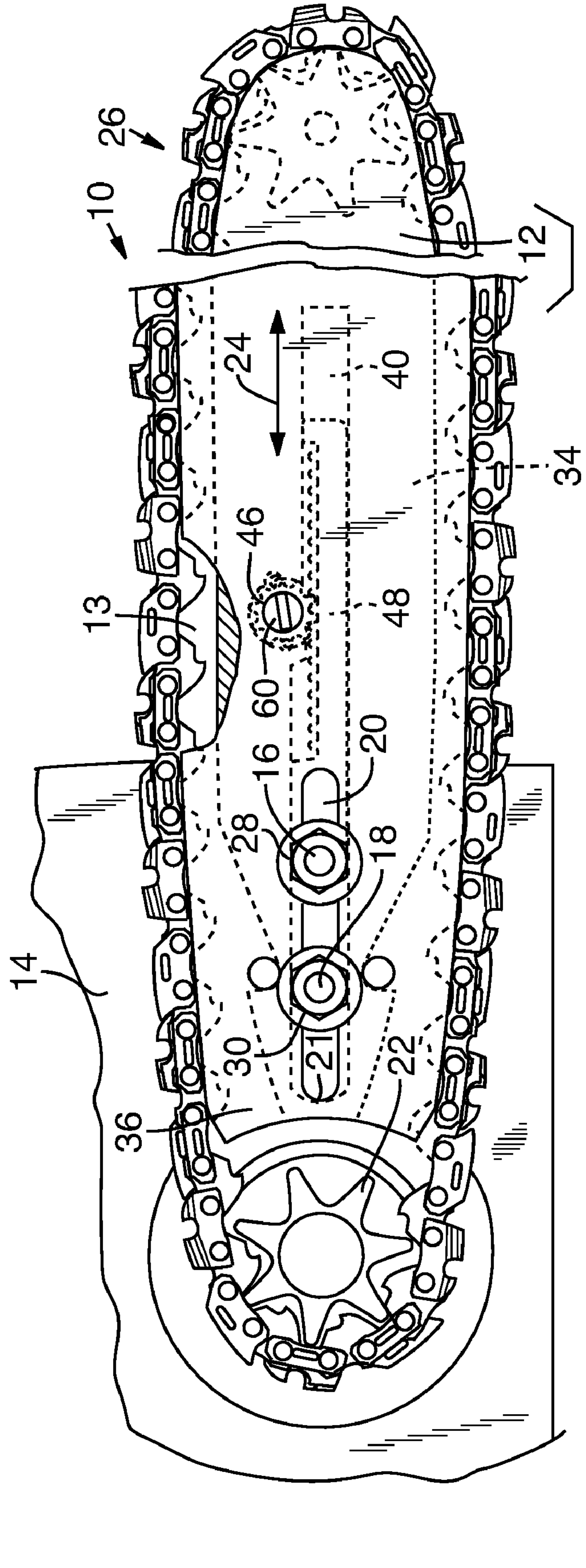
FIG. 4 (Prior Art)
FIG. 4 depicts a prior-art chain saw guide bar mounted to a chain saw housing.

In the embodiment depicted in FIG. 3, chain saw bar 100' again has a sliding member 110' fitted within channel 115' and adjacent to first tensioning member 120'. Sliding member 110' also has projections 112' which correspond to similar projections 110 of the embodiment of FIG. 1, described above. Similarly, channel 115' includes a wide portion 116' corresponding to the wide portion of the embodiment of FIG. 1. In the embodiment of FIG. 3, sliding member 110' has a series of recesses 114' formed into the shape of stairs or teeth. Latch 130' is mounted to one or both of the outer guide plates and is configured to rotate at axis 132'. Latch 130' is biased towards sliding member 110' by way of second tensioning member 140'. When sliding member 110' is forced away from the mounting stud (to the right in the accompanying figures) latch 130' falls into recesses 114' sequentially and ratchets sliding member 110' away from the mounting stud in a step-like fashion. As seen in FIG. 3, recesses 114' are shaped into a series of steps or teeth that allow the sliding member to slide and move along the latch in one direction only. Thus, in this embodiment sliding member 110' can be locked into place with respect to the chain saw bar at any of several positions dictated by the number and spacing of recesses 114'.

In order to unlock latch 130' from recesses 114' of sliding member 110', an opening may be formed in the outer guide plate near latch 130'. This opening will typically be formed in such a manner that a tool, for example a flat-head screwdriver, may be inserted therethrough in order to force latch 130' away from sliding member 110' and allow first tensioning member 120' to slide sliding member 110' towards the mounting stud. The depicted embodiment has a slot 136' that extends through at least one of the outer guide plates for this purpose.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A chain saw bar tensioning apparatus comprising:

a sliding member having a recess formed therein and adjacent to a first tensioning member, wherein the first tensioning member biases the sliding member in a direction such that when the apparatus is incorporated into a chain saw bar and mounted to a chain saw having a mounting stud projecting from a housing of the chain saw, the sliding member is biased towards the mounting stud; and a latch adjacent to a second tensioning member, wherein the recess of the sliding member is configured to receive the latch, and wherein the second tensioning member biases the latch towards the sliding member such that when the sliding member is forced in a direction away from the mounting stud the latch will eventually enter the recess and prevent the sliding member from moving towards the mounting stud.

2. The apparatus of claim 1, wherein the sliding member has a plurality of recesses formed therein that enable the sliding member to be ratcheted away from the mounting stud in a step-like fashion.

3. The apparatus of claim 1, wherein the first tensioning member and the second tensioning member comprise springs.

4. A chain saw comprising:

a chain saw bar mounted to a house of the chain saw via at least one mounting stud that projects from the house, the chain saw bar comprising a sliding member having a recess formed therein and adjacent to a first tensioning member, wherein the first tensioning member biases the sliding member towards the mounting stud; and a latch adjacent to a second tensioning member, wherein the recess of the sliding member is configured to receive the latch, and wherein the second tensioning member biases the latch towards the sliding member such that when the sliding member is forced in a direction away from the mounting stud the latch will eventually enter the recess and prevent the sliding member from moving towards the mounting stud.

5. A chain saw bar tensioning apparatus comprising:

a sliding member having a recess formed therein and adjacent to a means for biasing the sliding member, wherein the means for biasing the sliding member biases the sliding member in a direction such that when the apparatus is incorporated into a chain saw bar and mounted to a chain saw having a mounting stud projecting from a housing of the chain saw, the sliding member is biased towards the mounting stud; and a latch adjacent to a means for biasing the latch, wherein the recess of the sliding member is configured to receive the latch, and wherein the means for biasing the latch biases the latch towards the sliding member such that when the sliding member is forced in a direction away from the mounting stud the latch will eventually enter the recess and prevent the sliding member from moving towards the mounting stud.

6. The apparatus of claim 5, wherein the sliding member has a plurality of recesses formed therein that enable the sliding member to be ratcheted away from the mounting stud in a step-like fashion.

* * * * *